US010574289B2

(12) United States Patent
Li et al.

(10) Patent No.: US 10,574,289 B2
(45) Date of Patent: Feb. 25, 2020

(54) FREQUENCY HOPPING COMMUNICATION METHOD AND DEVICE

(71) Applicant: HUAWEI TECHNOLOGIES CO., LTD., Shenzhen, Guangdong (CN)

(72) Inventors: Zheng Li, Beijing (CN); Yanfei Zhang, Beijing (CN); Guangwei Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/422,453

(22) Filed: May 24, 2019

(65) Prior Publication Data

US 2019/0280733 A1 Sep. 12, 2019

Related U.S. Application Data

(63) Continuation of application No. PCT/CN2017/103133, filed on Sep. 25, 2017.

(30) Foreign Application Priority Data

Nov. 29, 2016 (CN) .......................... 2016 1 1071905

(51) Int. Cl.
*H04B 1/713* (2011.01)
*H04W 72/04* (2009.01)
(Continued)

(52) U.S. Cl.
CPC ........ *H04B 1/713* (2013.01); *H04W 72/0453* (2013.01); *H04W 88/02* (2013.01); *H04W 88/08* (2013.01)

(58) Field of Classification Search
CPC ............ H04B 1/713; H04B 2001/7154; H04B 1/7143; H04B 1/715; H04B 1/7156; H04W 72/0453; H04W 88/02; H04W 88/08
See application file for complete search history.

(56) References Cited

U.S. PATENT DOCUMENTS 6,072,784 A * 6/2000 Agrawal ............... H04W 52/28
370/311
6,836,515 B1 12/2004 Kay et al.
(Continued)

FOREIGN PATENT DOCUMENTS

CN 101110607 A 1/2008
CN 101170526 A 4/2008
(Continued)

OTHER PUBLICATIONS

International Search Report, dated Dec. 27, 2017, in International Application No. PCT/CN2017/103133 (4 pp.).

*Primary Examiner* — Ted M Wang
(74) *Attorney, Agent, or Firm* — Slater Matsil, LLP (57) ABSTRACT

A method includes: receiving, by a terminal device, a plurality of virtual channel indexes from a base station; selecting, by the terminal device, a virtual channel index from the plurality of virtual channel indexes; determining, by the terminal device based on the virtual channel index, physical channels corresponding to the virtual channel index on a plurality of subframes, where at least two of the physical channels corresponding to the virtual channel index on the plurality of subframes are different; and communicating, by the terminal device on at least one of the plurality of subframes, with the base station using the physical channel corresponding to the virtual channel index.

14 Claims, 5 Drawing Sheets

(51) Int. Cl.
*H04W 88/02* (2009.01)
*H04W 88/08* (2009.01)

(56) References Cited

U.S. PATENT DOCUMENTS

| | | |
|---|---|---|
| 2008/0294778 A1 | 11/2008 | Wang et al. |
| 2008/0310359 A1 | 12/2008 | McBeath et al. |
| 2016/0055830 A1 | 2/2016 | Lee et al. |
| 2016/0095147 A1 | 3/2016 | Kim et al. |
| 2016/0345297 A1 | 11/2016 | Chen et al. |
| 2017/0041113 A1* | 2/2017 | Park .................. H04B 7/04 |

FOREIGN PATENT DOCUMENTS

| | | |
|---|---|---|
| CN | 104253627 A | 12/2014 |
| CN | 104796845 A | 7/2015 |
| CN | 105472532 A | 4/2016 |
| EP | 0975191 A2 | 1/2000 |
| WO | 2013104119 A1 | 7/2013 |
| WO | 2014185744 A1 | 11/2014 |

* cited by examiner

FREQUENCY HOPPING COMMUNICATION METHOD AND DEVICE

CROSS-REFERENCE TO RELATED APPLICATIONS

This application is a continuation of international application No. PCT/CN2017/103133, filed on Sep. 25, 2017, which claims priority to Chinese Patent Application No. 201611071905.3, filed on Nov. 29, 2016, The disclosures of the aforementioned applications are hereby incorporated by reference in their entireties.

TECHNICAL FIELD

The embodiments of the present invention relates to the communications field, and in particular, to a frequency hopping communication method and a device.

BACKGROUND

The mobile Internet industry and the Internet of Things industry have developed rapidly, and an Internet of Things network device is low-cost, easy to deploy, and maintenance-free. In an enterprise market, main communication requirements of enterprise Internet of Things are a small amount of data and mass connections. Compared with a licensed spectrum of an operator, an unlicensed spectrum, especially a frequency band of Sub GHz, can effectively reduce network costs. Therefore, a narrowband communications system based on the unlicensed spectrum can meet the requirements.

Each region in each country has corresponding regulations on the unlicensed spectrum, so as to prevent all devices from irregularly and limitlessly sending data on the unlicensed spectrum. Before accessing a network, a device needs to be certified by regulations of each country. In other words, any device may not monitor a channel before sending data, but needs to meet a specific sending duty cycle; that is, total sending time of the device cannot exceed a threshold within a specific time.

In order to meet a requirement of regulations on the duty cycle, two technical means are commonly used in the unlicensed frequency band: one is listen before talk (LBT), that is, any device needs to monitor the channel before sending data; and the other is frequency hopping, that is, after sending the data on a channel for a period of time, the device switches to another frequency band to use another channel. Frequency hopping in a Bluetooth technology is used as an example. Bluetooth is a short-range wireless communications technology operating on an ISM frequency band of 2.4 GHz (2.40 to 2.48 GHz), and can form a small wireless personal access network (PAN). Bluetooth uses a series of unique measures such as Adaptive Frequency Hopping (AFH), LBT (Listen Before Talk), and power control to overcome interference and avoid conflicts.

However, Bluetooth uses a time division multiple access technology, and a central device cannot communicate with a plurality of secondary devices at a same time point, and therefore a Bluetooth primary device cannot connect to many secondary devices at a same time point. Consequently, a requirement of the Internet of Things for mass connections cannot be met.

SUMMARY

Embodiments of the present invention provide a frequency hopping communication method and a device, so as to determine, in a narrowband system of an unlicensed spectrum, a physical channel used for frequency hopping.

A first aspect of the embodiments of the present invention provides a frequency hopping communication method, where the method includes:

receiving, by a terminal device, a plurality of virtual channel indexes from a base station, and optionally, receiving, by the terminal device, the plurality of virtual channel indexes from the base station using a broadcast message or a dedicated message.

Therefore, the terminal device selects a virtual channel index from a virtual channel index set. It should be noted that a plurality of terminal devices may select different virtual channel indexes from the virtual channel index set. Optionally, the terminal device may further receive a physical cell identifier, a configuration parameter of a quantity of system channels, a frame number, a subframe number, and a super frame number, and determine, based on the virtual channel index and one or any combination of the foregoing parameters, physical channels corresponding to the virtual channel index on a plurality of subframes.

A virtual channel index may be used to determine physical channels corresponding to the virtual channel index on the plurality of subframes, and because of a restriction of regulations, at least two of the physical channels corresponding to the virtual channel index on the plurality of subframes are different. Further, because frequency hopping is required, frequency hopping may be performed once after communication is performed on each subframe. That is, in the physical channels corresponding to the plurality of virtual channel indexes on the plurality of subframes, physical channels corresponding to a same virtual channel index on two adjacent subframes are different.

After determining the physical channel corresponding to the virtual channel index on each subframe, the terminal device may communicate, on at least one of the plurality of subframes, with the base station using the physical channel corresponding to the virtual channel index. Optionally, communication may be performed on all of the plurality of subframes using the physical channel corresponding to the virtual channel index.

On a subframe, the base station may simultaneously communicate with the plurality of terminal devices. Compared with a Bluetooth technology, under a same condition, a quantity of the terminal devices that communicate with a base station is greatly increased, and therefore, a requirement of the Internet of Things for mass connections can be correspondingly met.

With reference to the first aspect, in a first implementation of the first aspect of the embodiments of the present invention, a detailed method of determining calculation of the physical channel may include:

inputting the virtual channel index and any subframe S in the plurality of subframes, where a number of the subframe S includes a super frame number, a frame number, and a subframe number; and further inputting a physical cell identifier and a configuration parameter of a quantity of system channels for calculation. Specifically, the terminal device calculates the physical cell identifier and the S using a preset algorithm, to obtain a first value T1 of four bits, then performs bit reordering on the T1 to obtain a second value T2 of four bits, then calculates the T2 and the S to obtain a third decimal value T3, and then calculates the T3 and the virtual channel index to obtain a physical channel related to the virtual channel index, the physical cell identifier, and the configuration parameter of the quantity of system channels.

Because the plurality of virtual channel indexes are disordered according to a specific rule, a corresponding physical channel that meets randomicity and orthogonality may be obtained.

A second aspect of the embodiments of the present invention provides a frequency hopping communication method, where the method includes:

generating, by a base station, a plurality of virtual channel indexes, and optionally, sending, by the base station, the plurality of generated virtual channel indexes to a plurality of terminal devices using a broadcast message or a dedicated message.

Optionally, the base station may further generate and send a physical cell identifier, a configuration parameter of a quantity of system channels, a frame number, a subframe number, and a super frame number, and determine, based on the virtual channel index and one or any combination of the foregoing parameters, physical channels corresponding to the virtual channel index on a plurality of subframes.

A virtual channel index may be used to determine physical channels corresponding to the virtual channel index on the plurality of subframes, and because of a restriction of regulations, at least two of the physical channels corresponding to the virtual channel index on the plurality of subframes are different. Further, because frequency hopping is required, frequency hopping may be performed once after communication is performed on each subframe. That is, in the physical channels corresponding to the plurality of virtual channel indexes on the plurality of subframes, physical channels corresponding to a same virtual channel index on two adjacent subframes are different.

Because physical channels corresponding to the virtual channel index on adjacent subframes are different, after communication is performed on each subframe, the terminal device performs frequency hopping, and this meets a requirement of related regulations.

Then, based on any virtual channel index D in the plurality of virtual channel indexes, the base station may determine a physical channel corresponding to the D on each of the plurality of subframes, where at least two of the physical channels corresponding to the D on different subframes are different. Further, in the physical channels corresponding to the plurality of virtual channel indexes on the plurality of subframes, physical channels corresponding to a same virtual channel index on two adjacent subframes are different.

It should be noted that, when selecting the D, the terminal device uses a calculation method that is the same as a calculation method used by the base station, and a same physical channel on a same subframe is obtained, and then the physical channel is used for communication between the terminal device and the base station on the subframe.

Optionally, when the base station determines the physical channel, physical channels corresponding to any two of the plurality of virtual channel indexes on a subframe are different, and orthogonality is met.

Further, in some feasible embodiments, a virtual channel index is corresponding to a subframe group, and subframe groups corresponding to two virtual channel indexes may be different. If subframe groups corresponding to two different virtual channel indexes have a overlapping subframe, physical channels corresponding to the two different virtual channel indexes on the subframe are also different.

Because the physical channels corresponding to any two virtual channel indexes on the subframe are different, an obtained physical channel corresponding to a virtual channel index on each subframe may meet orthogonality. Therefore, a channel resource is fully used, so that a base station can communicate with as many terminal devices as possible.

After determining the physical channel corresponding to the virtual channel index on each subframe, the base station may communicate, on a plurality of subframes, with the plurality of terminal devices using the physical channel corresponding to the virtual channel index.

On a subframe, the base station may simultaneously communicate with the plurality of terminal devices. Compared with a Bluetooth technology, under a same condition, a quantity of terminal devices that communicate with a base station is greatly increased, and therefore, a requirement of the Internet of Things for mass connections can be correspondingly met.

With reference to the second aspect, in a first implementation of the second aspect of the embodiments of the present invention, the method includes:

inputting the virtual channel index and any subframe S in the plurality of subframes, where a number of the subframe S includes a super frame number, a frame number, and a subframe number; and further inputting a physical cell identifier and a configuration parameter of a quantity of system channels for calculation. Specifically, the base station may further calculate the physical cell identifier and the S using a preset algorithm, to obtain a first value T1 of four bits, then performs bit reordering on the T1 to obtain a second value T2 of four bits, then calculates the T2 and the S to obtain a third decimal value T3, and then calculates the T3 and the virtual channel index to obtain a physical channel related to the virtual channel index, the physical cell identifier, and the configuration parameter of the quantity of system channels.

Because the plurality of virtual channel indexes are disordered according to a specific rule, a corresponding physical channel that meets randomicity and orthogonality may be obtained.

A third aspect of the embodiments of the present invention provides a frequency hopping communication method, where the method includes:

generating, by a base station, a plurality of virtual channel indexes, and optionally, sending, by the base station, the plurality of generated virtual channel indexes to a plurality of terminal devices using a broadcast message or a dedicated message.

Optionally, the base station may further generate and send a physical cell identifier, a configuration parameter of a quantity of system channels, a frame number, a subframe number, and a super frame number, and determine, based on the virtual channel index and one or any combination of the foregoing parameters, physical channels corresponding to the virtual channel index on a plurality of subframes.

A virtual channel index may be used to determine physical channels corresponding to the virtual channel index on the plurality of subframes, and because of a restriction of regulations, at least two of the physical channels corresponding to the virtual channel index on the plurality of subframes are different. Further, because frequency hopping is required, frequency hopping may be performed once after communication is performed on each subframe. That is, in the physical channels corresponding to the plurality of virtual channel indexes on the plurality of subframes, physical channels corresponding to a same virtual channel index on two adjacent subframes are different.

Because physical channels corresponding to the virtual channel index on adjacent subframes are different, after communication is performed on each subframe, the terminal device performs frequency hopping, and this meets a requirement of related regulations.

The base station may determine, based on any virtual channel index D in the plurality of virtual channel indexes, a physical channel corresponding to the D on each of the plurality of subframes. When the base station determines the physical channel, physical channels corresponding to any two of the plurality of virtual channel indexes on a subframe are different, and orthogonality is met. Further, in some feasible embodiments, a virtual channel index is corresponding to a subframe group, and subframe groups corresponding to two virtual channel indexes may be different. If subframe groups corresponding to two different virtual channel indexes have a overlapping subframe, physical channels corresponding to the two different virtual channel indexes on the subframe are also different.

Because the physical channels corresponding to any two virtual channel indexes on the subframe are different, an obtained physical channel corresponding to a virtual channel on each subframe may meet orthogonality. Therefore, a channel resource is fully used, so that a base station can communicate with as many terminal devices as possible.

Further, in some feasible embodiments, a virtual channel index is corresponding to a subframe group, and subframe groups corresponding to two virtual channel indexes may be different. If subframe groups corresponding to two different virtual channel indexes have a overlapping subframe, physical channels corresponding to the two different virtual channel indexes on the subframe are also different.

Because the physical channels corresponding to any two virtual channel indexes on the subframe are different, an obtained physical channel corresponding to a virtual channel on each subframe may meet orthogonality. Therefore, a channel resource is fully used, so that a base station can communicate with as many terminal devices as possible.

Because the physical channels corresponding to any two virtual channel indexes on the subframe are different, an obtained physical channel corresponding to a virtual channel on each subframe may meet orthogonality. Therefore, a channel resource is fully used, so that a base station can communicate with as many terminal devices as possible.

After determining the physical channel corresponding to the virtual channel index on each subframe, the base station may communicate, on a plurality of subframes, with the plurality of terminal devices using the physical channel corresponding to the virtual channel index.

On a subframe, the base station may simultaneously communicate with the plurality of terminal devices. Compared with a Bluetooth technology, under a same condition, a quantity of terminal devices that communicate with a base station is greatly increased, and therefore, a requirement of the Internet of Things for mass connections can be correspondingly met.

With reference to the third aspect, in a first implementation of the third aspect of the embodiments of the present invention, the method includes that:

for the virtual channel index D in the plurality of virtual channel indexes and any subframe S in the plurality of subframes, the base station calculates the D and the S to obtain a first value T1, where the T1 is a value of four bits; the base station performs bit reordering on values of four bits of the T1 using a preset algorithm, to obtain a second value T2, where the T2 is a value of four bits; the base station calculates the T2 and the S using the preset algorithm, to obtain a third value T3; and the base station calculates the T3 and the D using the preset algorithm, to obtain a physical channel corresponding to the D on the S.

Because the plurality of virtual channel indexes are disordered according to a specific rule, a corresponding physical channel that meets randomicity and orthogonality may be obtained.

A fourth aspect of the embodiments of the present invention provides a terminal device, where the terminal device includes:

a transceiver unit, configured to receive a plurality of virtual channel indexes from a base station; and a processing unit, configured to select a virtual channel index from the plurality of virtual channel indexes, and determine, based on the virtual channel index, physical channels corresponding to the virtual channel index on a plurality of subframes, where at least two of the physical channels corresponding to the virtual channel index on the plurality of subframes are different. The transceiver unit is further configured to communicate, on at least one of the plurality of subframes, with the base station using the physical channel corresponding to the virtual channel index.

On a subframe, the base station may simultaneously communicate with the plurality of terminal devices. Compared with a Bluetooth technology, under a same condition, a quantity of terminal devices that communicate with a base station is greatly increased, and therefore, a requirement of the Internet of Things for mass connections can be correspondingly met.

Optionally, the plurality of virtual channel indexes are received from the base station using a broadcast message or a dedicated message.

With reference to the fourth aspect, in a first implementation of the fourth aspect of the embodiments of the present invention, the processing unit is configured to:

for the virtual channel index and any subframe S in the plurality of subframes, calculate a physical cell identifier and the S using a preset algorithm, to obtain a first value T1, where the T1 is a value of four bits; perform bit reordering on values of four bits of the T1 using the preset algorithm, to obtain a second value T2, where the T2 is a value of four bits; calculate the T2 and the S using the preset algorithm, to obtain a third value T3; and calculate the T3 and the virtual channel index using the preset algorithm, to obtain a physical channel corresponding to the virtual channel index on the S.

A fifth aspect of the embodiments of the present invention provides a base station, where the base station includes:

a transceiver unit, configured to send a plurality of generated virtual channel indexes; and a processing unit, configured to: for any virtual channel index D in the plurality of virtual channel indexes, determine, based on the D, a physical channel corresponding to the D on each of the plurality of subframes, where at least two of the physical channels corresponding to the D on different subframes are different, and determine a virtual channel index selected by a terminal device, where the virtual channel index is one of the plurality of virtual channel indexes. The transceiver unit is further configured to communicate, on at least one of the plurality of subframes, with the terminal device using the physical channel corresponding to the virtual channel index.

On a subframe, the base station may simultaneously communicate with the plurality of terminal devices. Compared with a Bluetooth technology, under a same condition, a quantity of terminal devices that communicate with a base station is greatly increased, and therefore, a requirement of the Internet of Things for mass connections can be correspondingly met.

Optionally, the processing unit is further configured to:

determine, based on each of the plurality of virtual channel indexes, a physical channel corresponding to each virtual channel index on a subframe, where the physical channels corresponding to any two of the plurality of virtual channel indexes on the subframe are different.

Optionally, the processing unit is further configured to:

based on a subframe group corresponding to each of the plurality of virtual channel indexes, for any virtual channel index D in the plurality of virtual channel indexes, determine, based on the D, a physical channel corresponding to the D on each subframe in a subframe group corresponding to the D, where physical channels corresponding to any two of the plurality of virtual channel indexes on a same subframe are different.

A sixth aspect of the embodiments of the present invention provides a base station, where the base station includes:

a transceiver unit, configured to send a plurality of generated virtual channel indexes; and a processing unit, configured to determine, based on each of the plurality of virtual channel indexes, a physical channel corresponding to each virtual channel index on a subframe, where physical channels corresponding to any two of the plurality of virtual channel indexes on the subframe are different, and determine a virtual channel index selected by a terminal device, where the virtual channel index is one of the plurality of virtual channel indexes. The transceiver unit is further configured to communicate, on the subframe, with the terminal device using a physical channel corresponding to the virtual channel index.

On a subframe, the base station may simultaneously communicate with the plurality of terminal devices. Compared with a Bluetooth technology, under a same condition, a quantity of terminal devices that communicate with a base station is greatly increased, and therefore, a requirement of the Internet of Things for mass connections can be correspondingly met.

Optionally, the processing unit is further configured to:

based on a subframe group corresponding to each of the plurality of virtual channel indexes, for any virtual channel index D in the plurality of virtual channel indexes, determine, based on the D, a physical channel corresponding to the D on each subframe in a subframe group corresponding to the D, where physical channels corresponding to any two of the plurality of virtual channel indexes on a same subframe are different.

Optionally, the processing unit is further configured to:

for any virtual channel index D in the plurality of virtual channel indexes, determine, based on the D, a physical channel corresponding to the D on each of the plurality of subframes, where at least two of the physical channels corresponding to the D on different subframes are different.

Optionally, the transceiver unit is further configured to:

send the plurality of generated virtual channel indexes using a broadcast message or a dedicated message.

With reference to the sixth aspect, in a first implementation of the sixth aspect of the embodiments of the present invention, the processing unit is further configured to:

for the virtual channel index and any subframe S in the plurality of subframes, calculate a physical cell identifier and the S using a preset algorithm, to obtain a first value T1, where the T1 is a value of four bits; perform bit reordering on values of four bits of the T1 using the preset algorithm, to obtain a second value T2, where the T2 is a value of four bits; calculate the T2 and the S using the preset algorithm, to obtain a third value T3; and calculate the T3 and the virtual channel index using the preset algorithm, to obtain a physical channel corresponding to the virtual channel index on the S.

A seventh aspect of the embodiments of the present invention provides a terminal device, where the terminal device includes:

a transceiver and a processor. The transceiver is configured to receive a plurality of virtual channel indexes from a base station. The processor is configured to: select a virtual channel index from the plurality of virtual channel indexes, and determine, based on the virtual channel index, physical channels corresponding to the virtual channel index on a plurality of subframes, where at least two of the physical channels corresponding to the virtual channel index on the plurality of subframes are different. The transceiver is further configured to communicate, on at least one of the plurality of subframes, with the base station using the physical channel corresponding to the virtual channel index.

An eighth aspect of the embodiments of the present invention provides a base station, where the base station includes:

a transceiver and a processor. The transceiver is configured to send a plurality of generated virtual channel indexes.

The processor is configured to: for any virtual channel index D in the plurality of virtual channel indexes, determine, based on the D, a physical channel corresponding to the D on each of the plurality of subframes, where at least two of the physical channels corresponding to the D on different subframes are different; and determine a virtual channel index selected by a terminal device, where the virtual channel index is one of the plurality of virtual channel indexes. The transceiver is further configured to communicate, on at least one of the plurality of subframes, with the terminal device using the physical channel corresponding to the virtual channel index.

A ninth aspect of the embodiments of the present invention provides a base station, where the base station includes:

a transceiver and a processor. The transceiver is configured to send a plurality of generated virtual channel indexes. The processor is configured to: determine, based on each of the plurality of virtual channel indexes, a physical channel corresponding to each virtual channel index on a subframe, where physical channels corresponding to any two of the plurality of virtual channel indexes on the subframe are different; and determine a virtual channel index selected by a terminal device, where the virtual channel index is one of the plurality of virtual channel indexes. The transceiver is further configured to communicate, on the subframe, with the terminal device using a physical channel corresponding to the virtual channel index.

It can be learned from the foregoing technical solutions that the embodiments of the present invention have the following advantages:

The terminal device receives the plurality of virtual channel indexes from the base station; the terminal device selects a virtual channel index from the plurality of virtual channel indexes; the terminal device determines, based on the virtual channel index, the physical channels corresponding to the virtual channel index on a plurality of subframes, where at least two of the physical channels corresponding to the virtual channel index on the plurality of subframes are different; and the terminal device communicates, on at least one of the plurality of subframes, with the base station using the physical channel corresponding to the virtual channel index. Therefore, the base station may simultaneously communicate with a plurality of terminal devices on a subframe. Compared with a Bluetooth technology, under a same condition, a quantity of the terminal devices that communicate with a base station is greatly increased, so that a requirement of the Internet of Things for mass connections can be correspondingly met.

DESCRIPTION OF EMBODIMENTS

Embodiments of the present invention provide a frequency hopping communication method and a device, so as to determine, in a narrowband system of an unlicensed spectrum, a physical channel used for frequency hopping.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
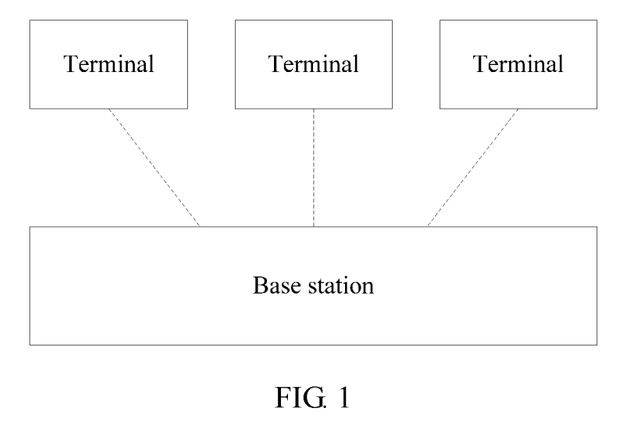
FIG. 1 is a schematic architectural diagram of a frequency hopping communications system according to an embodiment of the present invention.

FIG. 1 is a schematic architectural diagram of a frequency hopping communications system. The frequency hopping communications system is used in a narrowband system of an unlicensed spectrum, and includes a base station and a plurality of terminal devices.

With development of the mobile Internet industry and the Internet of Things industry, increasing mobile terminal devices are connected to each other and share more abundant data. Facing an enterprise market, an Internet of Things network device is low-cost, easy to deploy, and maintenance-free. Compared with a licensed spectrum of an operator, network costs can be effectively reduced on the unlicensed spectrum, especially on a frequency band of Sub GHz, and main communication requirements of enterprise Internet of Things are a small amount of data and mass connections. Therefore, a narrowband communications system based on the unlicensed spectrum can meet this requirement.

In the embodiments of the present invention, the base station refers to a public mobile communications base station, which is a form of a radio station and refers to a radio transceiver station that transfers information to a mobile phone terminal device in a specific radio coverage area using a mobile communications switching center.

In some feasible embodiments, the base station may include a baseband unit BBU and a radio remote unit RRU, where the RRU is connected to an antenna feeder system (antenna).

The terminal device used in the embodiments of the present invention may be a device that provides a user with voice and/or data connectivity, a handheld device with a radio connection function, or another processing device connected to a wireless modem. A wireless terminal device may communicate with one or more core networks using a radio access network (RAN). The wireless terminal device may be a mobile terminal device such as a mobile phone (or referred to as a "cellular" phone), or a computer with a mobile terminal device, for example, a portable, pocket-sized, handheld, computer built-in, or in-vehicle mobile apparatus that exchanges voice and/or data with the radio access network. For example, the wireless terminal device may be a device such as a personal communication service (PCS) phone, a cordless telephone set, a Session Initiation Protocol (SIP) phone, a wireless local loop (WLL,) station, or a personal digital assistant (PDA). The wireless terminal device may also be referred to as a system, a subscriber unit, a subscriber station (Subscriber Station), a mobile station, a mobile console (Mobile), a remote station, an access point, a remote terminal device, an access terminal device, a user terminal device, a terminal device, a user agent, user device, or user equipment.

Specifically, a mobile phone is used as an example. The terminal device may include components such as a radio frequency (RF) circuit, a memory, an input unit, a display unit, a sensor, an audio circuit, a Wireless Fidelity (Wi-Fi) module, a processor, and a power supply. A person skilled in the art may understand that the structure of the mobile phone imposes no limitation on the mobile phone, and the mobile phone may include more or fewer components, or combine some components, or have different component arrangements, and this is not limited herein.

In some feasible embodiments, the present invention may be used in a network with a star topology. Each node in the network is connected to a central node (also referred to as a central transfer station, which is generally a hub or a switch) in a point-to-point manner, and the central node transmits information to a destination node. The central node implements a centralized communication control policy. Therefore, the central node is rather complex and bears a much heavier burden than each node. Communication between any two nodes in the star network needs to be controlled by the central node.

The network with a star topology is a centralized control network. The entire network is managed by performing centralized access control by the central node, and the nodes communicate with each other through the center node. Each node that needs to send data sends the data to a central node, and the central node is responsible for sending the data to the destination node. Therefore, the central node is rather complex, a communication processing burden of each node is very light, and each node only needs to meet a simple communication requirement of a link.

Because the central node needs to connect to a plurality of devices and there are many lines, to facilitate centralized connection, a hub (HUB) or a switching device is used as the central node. Generally, a network environment is designed as a star topology structure. The star network is one of the most widely used and preferred network topology designs.

In the embodiments of the present invention, each region in each country has corresponding regulations on the unlicensed spectrum, so as to prevent all devices from irregularly and limitlessly sending data on the unlicensed spectrum. For example, the FCC (Federal Communications Commission) is directly responsible to the Congress, coordinates national and international communications by controlling radio broadcasting, television, telecommunications, satellites, and cables, and is responsible for authorizing and managing radio frequency transmission apparatuses and devices other than those used by the federal government. The FCC requires that a communications device meet a low duty cycle. In other words, any device may not monitor a channel before sending data, but needs to meet a specific sending duty cycle; that is, total sending time of the device cannot exceed a threshold within a specific time. The FCC 15.247 is used as an example. On frequency bands 902-928 MHz, 2400-2483.5 MHz, and 5725-5850 MHz, to prevent one device from occupying a channel for a long time, it is required that scheduling and negotiation not be performed between devices.

Generally, in order to meet a requirement of regulations on the duty cycle, two technical means are commonly used in the unlicensed frequency band: one is listen before talk LBT (listen before talk), that is, any device needs to monitor the channel before sending data; and the other is frequency hopping technology (frequency hopping), that is, after sending the data on a channel for a period of time, the device switches to another frequency band to use another channel. The FCC specifies frequency hopping indexes such as a quantity of frequency hopping channels, a duty cycle of a single channel, and frequency hopping bandwidth. Before accessing the network, the device needs to be certified by regulations of each country: In North America, FCC regulations are used; and in other countries, regulations based on the FCC regulations are used.

In the embodiments of the present invention, both the base station and the terminal device are provided with a built-in frequency hopping module, and the frequency hopping module uses a frequency hopping technology for communication between the base station and the terminal device.

In some feasible embodiments, frequency hopping is one of the most commonly used spread spectrum manners. A working principle of the frequency hopping is that a carrier frequency used for transmitting signals by a receiving side and a sending side is changed discretely according to a predetermined rule; that is, the carrier frequency used for communication randomly hops under control of a pseudo random change code. A technology used for frequency hopping is referred to as a frequency hopping technology (FHSS), which means that the receiving side and the sending side using a specific type of narrow-band carrier at the same time to a non-specific receiver.

From an implementation of the communications technology, the frequency hopping is a communication manner in which multi-frequency shift keying is performed using a code sequence, and is also a code controlled carrier frequency hopping communications system. In terms of time domain, a frequency hopping signal is a multi-frequency shift keying signal. In terms of frequency domain, a frequency spectrum of the frequency hopping signal randomly hops at unequal intervals on a very wide band. It should be noted that a frequency hopping controller is a core component, and includes functions such as frequency hopping pattern generation, synchronization, and adaptive control. A frequency combiner obtains, through combination, a required frequency under control of the frequency hopping controller. A data terminal device performs error control on the data.

With rapid development of the mobile Internet industry and the Internet of Things industry, the main communication requirements of the enterprise Internet of Things are a small amount of data and mass connections. Compared with a licensed spectrum, the unlicensed spectrum can effectively reduce the network costs. However, there are corresponding regulations on the unlicensed spectrum, so as to prevent all devices from irregularly and limitlessly sending data on the unlicensed spectrum.

Two technical means are commonly used in an unlicensed frequency band: one is that any device needs to monitor the channel before sending the data; and the other is the frequency hopping, that is, after sending the data on a channel for a period of time, the device switches to another frequency band to use another channel, for example, a Bluetooth technology. However, when communicating with a plurality of secondary devices using the Bluetooth technology, a central device cannot communicate with the plurality of secondary devices at a same time point. Consequently, a requirement of the current Internet of Things industry for mass connections cannot be met.

Therefore, in this embodiment of the present invention, the terminal device receives a plurality of virtual channel indexes from the base station; the terminal device selects a virtual channel index from the plurality of virtual channel indexes; the terminal device determines, based on the virtual channel index, physical channels corresponding to the virtual channel index on a plurality of subframes, where at least two of the physical channels corresponding to the virtual channel index on the plurality of subframes are different; and the terminal device communicates, on at least one of the plurality of subframes, with the base station using the physical channel corresponding to the virtual channel index. Therefore, the base station may simultaneously communicate with a plurality of terminal devices on a subframe. Under a same condition as a Bluetooth technology, a quantity of the terminal devices that communicate with a base station is greatly increased, so that a requirement of the Internet of Things for mass connections can be correspondingly met.

Figure 2:
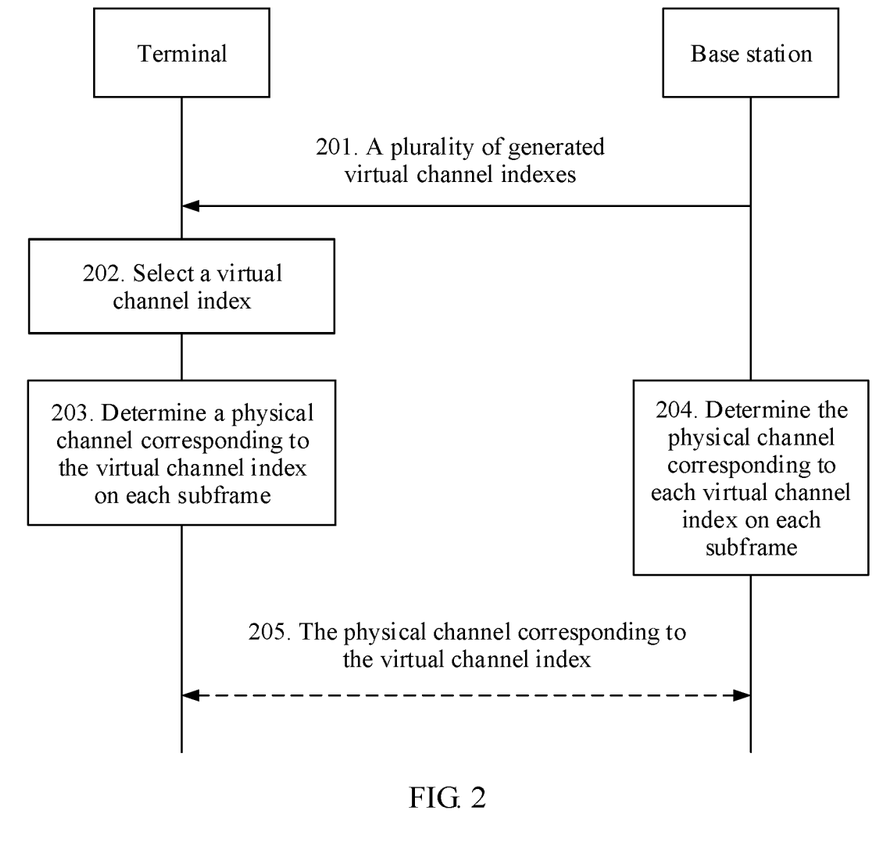
FIG. 2 is a schematic flowchart of an embodiment of a frequency hopping communication method according to an embodiment of the present invention.

For ease of understanding, a detailed procedure in this embodiment of this application is described below. FIG. 2 is a schematic flowchart of an embodiment of a frequency hopping communication method according to an embodiment of the present invention. The method includes the following steps.

201. A base station sends a plurality of generated virtual channel indexes.

In this embodiment of the present invention, a physical channel is a vivid analogy of a path between a transmit end and a receive end in wireless communication. For a radio wave, there is no physical connection between the transmit end and the receive end, and there may be more than one propagation path. To vividly describe work between the transmit end and the receive end, it may be imagined that there is an invisible road link between the transmit end and the receive end, and this road link is referred to as a channel.

Channel bandwidth limits a lowest frequency and a highest frequency at which a signal is allowed to pass the channel, and may be understood as a frequency passband.

In this embodiment of the present invention, in a network with a star topology, a plurality of terminal devices simultaneously perform uplink services at a same time, and for a frequency band of Sub GHz, the FCC regulation stipulates that a device cannot limitlessly occupy a channel, and therefore, a user needs to perform channel frequency hopping, and a series of locations of frequency hopping channels that can be predicted by a real physical channel at different times according to a frequency hopping rule is referred to as a virtual physical channel.

In some feasible embodiments, the base station may send the plurality of virtual channel indexes to the terminal device from the base station using a broadcast message or a dedicated message. The broadcast message and the dedicated message are in the current system, and details are not described herein.

202. A terminal device selects a virtual channel index from the plurality of virtual channel indexes.

In this embodiment of the present invention, when receiving the plurality of virtual channel indexes, the terminal device may select a virtual channel index from the plurality of virtual channel indexes, so as to use a virtual channel represented by the virtual channel index, and uses a physical channel corresponding to the virtual channel on each subframe to communicate with the base station.

203. The terminal device determines, based on the virtual channel index, physical channels corresponding to the virtual channel index on a plurality of subframes.

In some feasible embodiments, the terminal device may further determine, based on the virtual channel index and one or any combination of the following: a physical cell identifier, a configuration parameter of a quantity of system channels, a frame number, a subframe number, or a super frame number, the physical channels corresponding to the virtual channel index on the plurality of subframes.

In some feasible embodiments, the physical cell identifier, that is, PCI (full name: Physical Cell Identifier), is used by a terminal device in LTE to distinguish between radio signals of different cells. The LTE system provides 504 PCIs, which are conceptually similar to 128 scrambling codes of a TD-SCDMA system. When configuration is performed using a network management system, a number between 0 and 503 is configured for a cell. In an LTE cell search procedure, a specific cell ID is determined by searching a primary synchronization sequence (PSS, and there are three possibilities in total), a secondary synchronization sequence (SSS, and there are 168 possibilities in total), or a combination of the primary synchronization sequence and the secondary synchronization sequence. In this embodiment of the present invention, the PCI is described using 36 physical cells as an example, that is, a value of the PCI is 0 to 35 in a decimal system, and 0 to 10011 in a binary system.

In some feasible embodiments, a number of the subframe includes the super frame number, the frame number, and the subframe number. One super frame includes eight frames, and one frame includes six subframes. In a narrowband Internet of Things system, there are 8192 super frames, and values of the 8192 super frames are 0 to 8191. The number of the subframe may include 19 bits, where the super frame number includes 13 bits, the frame number includes 3 bits, and the subframe number includes 3 bits. On an unlicensed spectrum of the narrowband Internet of Things system, total system bandwidth is 1.8 MHz, and is divided into nine channels of 180 kHz and guard bandwidth of 180 kHz. The channel of 180 kHz includes six sub-channels of 30 kHz. In system time domain, concepts of an eSubframe, an eFrame (eFrame), and an eSuperframe are provided. In this embodiment, an example in which a subframe is 250 ms, a frame includes six subframes, and a super frame includes eight frames is used for description.

In some feasible embodiments, the base station may further generate the configuration parameter of the quantity of system channels. Generally, the configuration parameter of the quantity of system channels may be several times of a quantity of physical channels, and is generally 6 times the quantity of physical channels. Because one frame includes six subframes, if the configuration parameter of the quantity of system channels is 9, the quantity of physical channels is 9×6=54.

It should be noted that, in this embodiment of the present invention, at least two of the physical channels corresponding to the virtual channel index on the plurality of subframes are different. Due to limitation of regulations, a physical channel in an unlicensed spectrum cannot serve a terminal device for a long time. Therefore, in this embodiment of the present invention, when communicating with the base station, a terminal device needs to switch from one physical channel to another physical channel. Therefore, when the terminal device selects a virtual channel index, such regulations also need to be followed. The physical channels corresponding to the virtual channel index on the plurality of subframes cannot be all the same. Therefore, at least two physical channels need to be different, so that a requirement of the regulations is met.

Optionally, in the physical channels corresponding to the plurality of virtual channel indexes on the plurality of subframes, if physical channels corresponding to a same virtual channel index on two adjacent subframes are different, a requirement of the regulations on frequency hopping can be fully met.

It should be noted that, in some feasible embodiments, the virtual channel index is generated by the base station, and the base station generates the plurality of virtual channel indexes, where the virtual channel index represents a virtual channel, and the virtual channel is a physical channel on each subframe in a corresponding subframe group. It should be noted that a quantity of the plurality of virtual channel indexes is the same as the quantity of physical channels, and details are not described herein.

Figure 3:
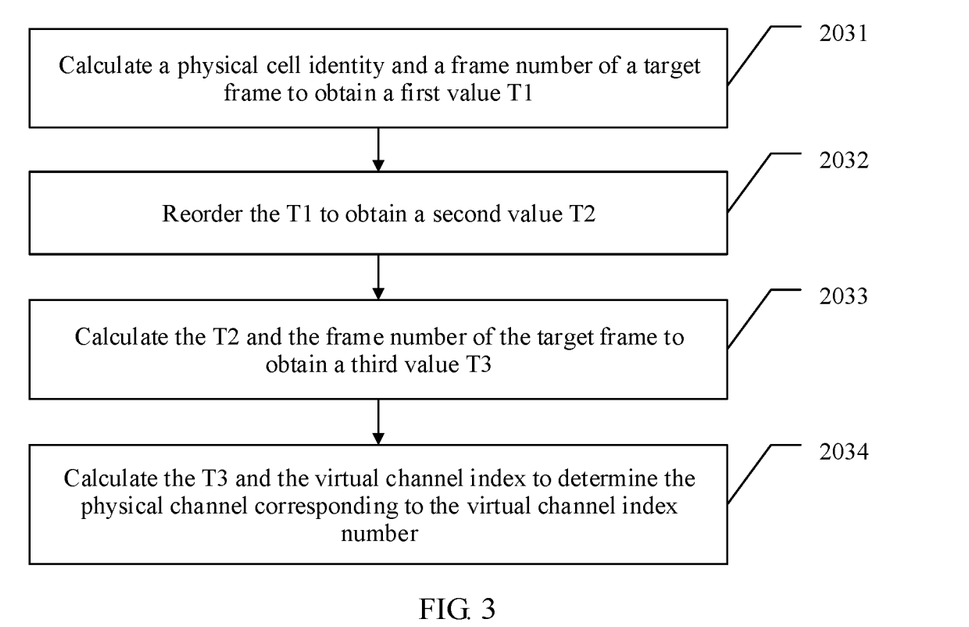
FIG. 3 is a schematic flowchart of an embodiment of determining a physical channel on a subframe based on a virtual channel index according to an embodiment of the present invention.

For a detailed calculation process, refer to FIG. 3. In some feasible embodiments, an embodiment of determining the physical channel on the subframe based on the virtual channel index includes the following steps.

2031. For the virtual channel index and any subframe S in the plurality of subframes, the terminal device calculates a physical cell identifier and the S using a preset algorithm, to obtain a first value T1, where the T1 is a value of four bits.

In this embodiment of the present invention, the physical cell identifier and the number of the subframe may be first calculated using the preset algorithm, to obtain the first binary value T1 of four bits.

Specifically, a value TimeStamp[18:0] is first defined, which is a binary number and includes 19 bits, and the 19 bits are respectively 0 or 1 from the zeroth bit to the 18$^{th}$ bit. In this embodiment of the present invention, the value of the TimeStamp[18:0] is determined by the number of the subframe, that is, the super frame number, the frame number, and the subframe number. Specifically, TimeStamp[18:0]=a super frame number×6×8+a frame number×6+a subframe number, so as to obtain a binary value TimeStamp[18:0] of 19 bits.

It should be noted that, in TimeStamp[18:0], for example, TimeStamp[2:0] represents a value whose zeroth bit (the zeroth digit is a units digit) to the second bit (the second bit is a hundreds digit) are respectively 0 or 1, TimeStamp[18:7] represents a value whose seventh bit to the 18$^{th}$ bit are respectively 0 or 1, and so on.

In this embodiment of the present invention, a binary constant PCI[3:0] of four bits (because a value of the PCI is 0 to 35 in the decimal system, the value of the PCI is 0 to 100011 in the binary system, and therefore, a complete PCI includes 6 bits of 0 or 1; PCI[3:0] represents numbers of the zeroth to the third bits of the PCI) may be added to a 4-bit T0[3:0] (a value of T0[3:0] herein is TimeStamp[4:1]), and then, a mod 16 operation is performed on the sum to obtain an output T1[3:0]. It should be noted that a purpose of performing the mod 16 operation is to disorder the numbers.

For example, an input physical cell is:
PCI[6:0]=111101, TimeStamp[18:0]=1001001011100010101,
then PCI[3:0]=1101, T0[3:0]=TimeStamp[4:1]=1010,
and then PCI[3:0]+T0[3:0]=10111, which is 23 in the decimal system; after the mod 16 operation is performed, 7 is obtained, and a binary value of 7 is 111. Therefore, T1[3:0]=0111.

2032. The terminal device performs bit reordering on values of four bits of the T1 using the preset algorithm, to obtain a second value T2, where the T2 is a value of four bits.

In some feasible embodiments, optionally, the numbers may be further disordered by performing the bit reordering.

Specifically, six control words B[0] to B[5] may be set. If a control word is true, bits at corresponding locations are exchanged. As shown below, for example, if B[0] is true, two bits T1[0] and T1[1] are exchanged. If the control word is true, bits are exchanged.

| Control word | Value |
| --- | --- |
| B[0] | Xor (T1[0], T1[1]) |
| B[1] | Xor (T1[2], T1[3]) |
| B[2] | Xor (T1[0], T1[2]) |
| B[3] | Xor (T1[1], T1[3]) |
| B[4] | Xor (T1[0], T1[3]) |
| B[5] | Xor (T1[1], T1[2]) |

Then, a T2[3:0] obtained after the bit reordering is performed on T1[3:0] may be obtained.

For example, if T1[3:0]=0101, then:

| Control word | Value | T2 obtained by changing a value of T1 |
| --- | --- | --- |
| B[0] = 1 | Xor (T1[0], T1[1]) | 0110 |
| B[1] = 1 | Xor (T1[2], T1[3]) | 1010 |
| B[2] = 0 | Xor (T1[0], T1[2]) | 1010 |
| B[3] = 0 | Xor (T1[1], T1[3]) | 1010 |
| B[4] = 1 | Xor (T1[0], T1[3]) | 0011 |
| B[5] = 1 | Xor (T1[1], T1[2]) | 0110 |

Therefore, after all control words are changed, T2[3:0]=0110 is obtained.

2033. The terminal device calculates the T2 and the S using the preset algorithm, to obtain a third value T3.

In some feasible embodiments, T2[3:0] output after the bit reordering is performed is added to a constant C and A2[16:0] (a value of A2[16:0] herein is as follows: A2[2:0]=000). A2[14:3]=TimeStamp[16:5]. A2[16:15]=xor (TimeStamp[18:17], PCI[5:4]), that is, A2[15]=xor (TimeStamp[17], PCI[4]), A2[16]=xor (TimeStamp[18], PCI[5]), and then perform a mod 54 operation on the obtained result (in this embodiment, 6×n=54, where n is a system configuration parameter), to obtain an output decimal value T3, where a value of T3 is 0 to 53.

For example:
T2[3:0]=0110,
C=1010,
TimeStamp[16:5]=100101101100111000,
TimeStamp[18:17]=10,
PCI[5:4]=11,
then A2[16:15]=01, A2[14:3]=TimeStamp[16:5]=1001011011001110000,
then $$T2[3:0] + C + A2[16:0] = 0110 + 1010 + 1001011011001110000$$
$$= 1001011011010000000,$$

and then, a decimal value is 308864, and T3=38 is obtained after mod 54 is performed.

2034. The terminal device calculates the T3 and the virtual channel index using the preset algorithm, to obtain a physical channel corresponding to the virtual channel index on the S.

In this step, input parameters include T3, a configuration parameter n of the quantity of system channels, and a virtual channel index D, and output parameters include a channel index number and a sub-channel index number.

Specifically, in this embodiment, mapping values that are in a one to one correspondence with the decimal data T3 are obtained according to a corresponding mapping rule. The following table is a mapping value table. The first 27 numbers in the mapping value table are even numbers, and the last 27 elements are odd numbers. For example, if T3=50 and n=9, a mapping value 45 may be obtained according to the mapping value table.

| T3 | Mapping value |
| --- | --- |
| 0 | 0 |
| 1 | 2 |
| ... | ... |
| 3n − 1 | 6n − 2 |
| 3n | 1 |
| 3n + 1 | 3 |
| ... | ... |
| 6n − 1 | 6n − 1 |

The method further disorders the values.

In this embodiment of the present invention, n is a channel configuration parameter of the quantity of system channels, and a channel number (Channel_index) and a sub-channel number (Sub-Channel_index) of a physical channel corresponding to an input virtual channel index are obtained, and are calculated using the following formula:

Channel_index=floor((mapping value+$D$)/6),

Sub-channel_index=mod((mapping value+$D$),6).

If the obtained T3=4, the mapping value is 6, and is substituted into the following formula to obtain:

Channel_index=floor(mapping value/6)=1,

Sub-channel_index=mod(mapping value,6)=0.

Then, the physical channel corresponding to the virtual channel index is obtained: the frame number of the physical channel is 1, and the subframe number is 0.

It should be noted that a function of the floor function is "rounding down", that is, floor (x) is a maximum integer not greater than x. A mod operation, that is, a modulo operation, is an operation in which a remainder is obtained by dividing an integer x by another integer y in an integer operation, and a quotient of the operation is not considered. In the computer program design, there is a MOD operation, which means to obtain a remainder of a result after dividing one integer by another integer. For example, 7 mod 3=1, because after 7 is divided by 3, a quotient is 2 and a remainder is 1. The remainder of 1 is a result of the MOD operation.

For example:

If T3=50, n=9, and D=15, the mapping value is 47, then Channel_index=floor ((mapping value+D)/6)=floor ((47+15)/6)=10, Sub-channel_index=mod ((mapping value+D), 6)=mod ((47+15), 6)=2, and therefore, the frame number of the physical channel is 10, and the subframe number is 2.

204. For any virtual channel index D in the plurality of virtual channel indexes, the base station determines, based on the D, a physical channel corresponding to the D on each of the plurality of subframes, where at least two of the physical channels corresponding to the virtual channel index on the plurality of subframes are different.

In this embodiment of the present invention, the base station and the terminal device may separately calculate, based on the virtual channel indexes, different physical channels corresponding to the virtual channel index on all of the plurality of subframes. However, a difference lies in that: after selecting a virtual channel index, the terminal device only needs to calculate the physical channel corresponding to the virtual channel index; and after generating a plurality of virtual channel indexes, the base station may calculate each of the plurality of virtual channel indexes to obtain all the different physical channels on a subframe group corresponding to the plurality of virtual channel indexes. Therefore, in some feasible embodiments, for any virtual channel index D in the plurality of virtual channel indexes and a subframe group Z corresponding to the D, the base station determines, based on the D, a physical channel corresponding to the D on any subframe in the Z.

Optionally, in the physical channels corresponding to the plurality of virtual channel indexes on the plurality of subframes, physical channels corresponding to a same virtual channel index on two adjacent subframes are different. That is, optionally, after communication is completed on each frame, the terminal device and the base station change the physical channel for communication.

Optionally, physical channels corresponding to any two of the plurality of virtual channel indexes on the subframe are different. That is, on a same subframe, different virtual channel indexes are corresponding to different physical channels.

In some feasible embodiments, the obtained values may be calculated using the preset algorithm, to obtain the physical channel corresponding to the virtual channel index on the subframe; that is, the physical channel is in a one-to-one correspondence with the virtual channel index on the subframe. In other words, within a given network capacity, different terminal devices may obtain different frequency hopping channels at a same fixed time, that is, orthogonality is met. Optionally, based on the subframe group corresponding to each of the plurality of virtual channel indexes, for any virtual channel index D in the plurality of virtual channel indexes, the base station determines, based on the D, a physical channel corresponding to the D on each subframe in a subframe group corresponding to the D, where physical channels corresponding to any two of the plurality of virtual channel indexes on a same subframe are different.

In addition, randomicity may be implemented using the preset algorithm. The randomicity means that: A single terminal device obtains, at a fixed time, a fixed corresponding frequency hopping channel; and as the time changes, a time-based curve pattern of the frequency hopping channel is random, and all channels have an equal probability of being selected; that is, in the physical channels corresponding to the plurality of virtual channel indexes on the plurality of subframes, physical channels corresponding to a same virtual channel index on two adjacent subframes are different.

205. The terminal device communicates, on at least one of the plurality of subframes, with the base station using the physical channel corresponding to the virtual channel index.

In some feasible embodiments, after the terminal device determines the physical channel corresponding to the selected virtual channel index on each of the plurality of subframes, when determining to transmit data on a subframe, the terminal device may use the physical channel. Therefore, the terminal device may communicate, on at least one of the plurality of subframes, with the base station using the physical channel. It should be noted that performing communication may refer to sending information or receiving information, and this is not limited herein.

Figure 4:
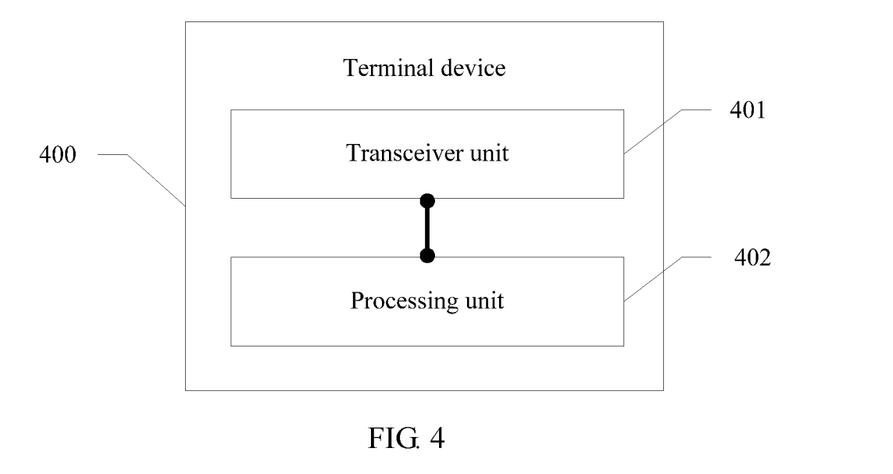
FIG. 4 is a schematic diagram of an embodiment of a terminal device according to an embodiment of the present invention.

Referring to FIG. 4, an embodiment of the present invention further provides a terminal device 400, where the terminal device 400 includes:

a transceiver unit 401, configured to receive a plurality of virtual channel indexes from a base station, and specifically configured to receive the plurality of virtual channel indexes from the base station using a broadcast message or a dedicated message; and a processing unit 402, configured to: select a virtual channel index from the plurality of virtual channel indexes, and determine, based on the virtual channel index, physical channels corresponding to the virtual channel index on a plurality of subframes, where at least two of the physical channels corresponding to the virtual channel index on the plurality of subframes are different, and optionally, in the physical channels corresponding to the plurality of virtual channel indexes on the plurality of subframes, physical channels corresponding to a same virtual channel index on two adjacent subframes are different. Specifically, for the virtual channel index and any subframe S in the plurality of subframes, a physical cell identifier and the S are calculated using a preset algorithm, to obtain a first value T1, where the T1 is a value of four bits; bit reordering is performed on values of four bits of the T1 using the preset algorithm, to obtain a second value T2, where the T2 is a value of four bits; the T2 and the S are calculated using the preset algorithm, to obtain a third value T3; and the T3 and the virtual channel index are calculated using the preset algorithm, to obtain a physical channel corresponding to the virtual channel index on the S.

The transceiver unit 401 is further configured to communicate, on at least one of the plurality of subframes, with the base station using the physical channel corresponding to the virtual channel index.

Figure 5:
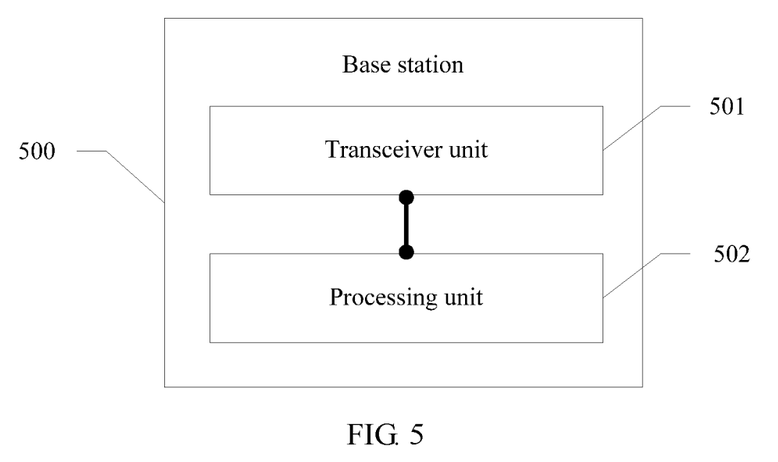
FIG. 5 is a schematic diagram of an embodiment of a base station according to an embodiment of the present invention.

Referring to FIG. 5, an embodiment of the present invention further provides a base station 500, where the base station 500 includes:

a transceiver unit 501, configured to send a plurality of generated virtual channel indexes; and a processing unit 502, configured to: for any virtual channel index D in the plurality of virtual channel indexes, determine, based on the D, a physical channel corresponding to the D on each of the plurality of subframes, where at least two of the physical channels corresponding to the D on different subframes are different, and determine a virtual channel index selected by a terminal device, where the virtual channel index is one of the plurality of virtual channel indexes.

Optionally, the base station 500 may determine, based on each of the plurality of virtual channel indexes, a physical channel corresponding to each virtual channel index on a subframe, where the physical channels corresponding to any two of the plurality of virtual channel indexes on the subframe are different.

Optionally, based on a subframe group corresponding to each of the plurality of virtual channel indexes, for any virtual channel index D in the plurality of virtual channel indexes, the base station 500 determines, based on the D, a physical channel corresponding to the D on each subframe in a subframe group corresponding to the D, where physical channels corresponding to any two of the plurality of virtual channel indexes on a same subframe are different.

Specifically, for the virtual channel index and any subframe S in the plurality of subframes, a physical cell identifier and the S are calculated using a preset algorithm, to obtain a first value T1, where the T1 is a value of four bits; bit reordering is performed on values of four bits of the T1 using the preset algorithm, to obtain a second value T2, where the T2 is a value of four bits; the T2 and the S are calculated using the preset algorithm, to obtain a third value T3; and the T3 and the virtual channel index are calculated using the preset algorithm, to obtain a physical channel corresponding to the virtual channel index on the S.

The transceiver unit 501 is further configured to communicate, on at least one of the plurality of subframes, with the terminal device using the physical channel corresponding to the virtual channel index.

Figure 6:
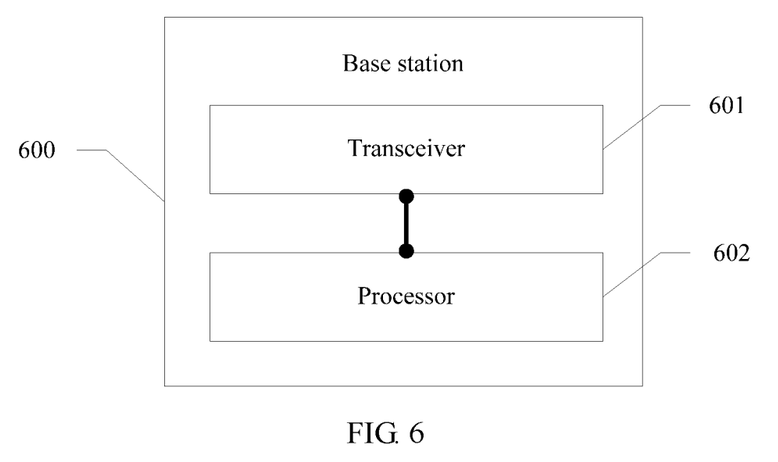
FIG. 6 is a schematic diagram of an embodiment of a base station according to an embodiment of the present invention.

Referring to FIG. 6, an embodiment of the present invention further provides a base station 600, where the base station 600 includes:

a transceiver unit 601, configured to: send a plurality of generated virtual channel indexes; and send the plurality of generated virtual channel indexes using a broadcast message or a dedicated message; and a processing unit 602, configured to: determine, based on each of the plurality of virtual channel indexes, a physical channel corresponding to each virtual channel index on a subframe, where the physical channels corresponding to any two of the plurality of virtual channel indexes on the subframe are different, and determine a virtual channel index selected by the terminal device, where the virtual channel index is one of the plurality of virtual channel indexes.

Optionally, for any virtual channel index D in the plurality of virtual channel indexes, the base station 600 determines, based on the D, a physical channel corresponding to the D on each of the plurality of subframes, where at least two of the physical channels corresponding to the D on different subframes are different.

Optionally, based on a subframe group corresponding to each of the plurality of virtual channel indexes, for any virtual channel index D in the plurality of virtual channel indexes, the base station 600 determines, based on the D, a physical channel corresponding to the D on each subframe in a subframe group corresponding to the D, where physical channels corresponding to any two of the plurality of virtual channel indexes on a same subframe are different.

Specifically, for the virtual channel index and any subframe S in the plurality of subframes, a physical cell identifier and the S are calculated using a preset algorithm, to obtain a first value T1, where the T1 is a value of four bits; bit reordering is performed on values of four bits of the T1 using the preset algorithm, to obtain a second value T2, where the T2 is a value of four bits; the T2 and the S are calculated using the preset algorithm, to obtain a third value T3; and the T3 and the virtual channel index are calculated using the preset algorithm, to obtain a physical channel corresponding to the virtual channel index on the S.

The transceiver unit 601 is further configured to communicate, on the subframe, with the terminal device using the physical channel corresponding to the virtual channel index.

Figure 7:
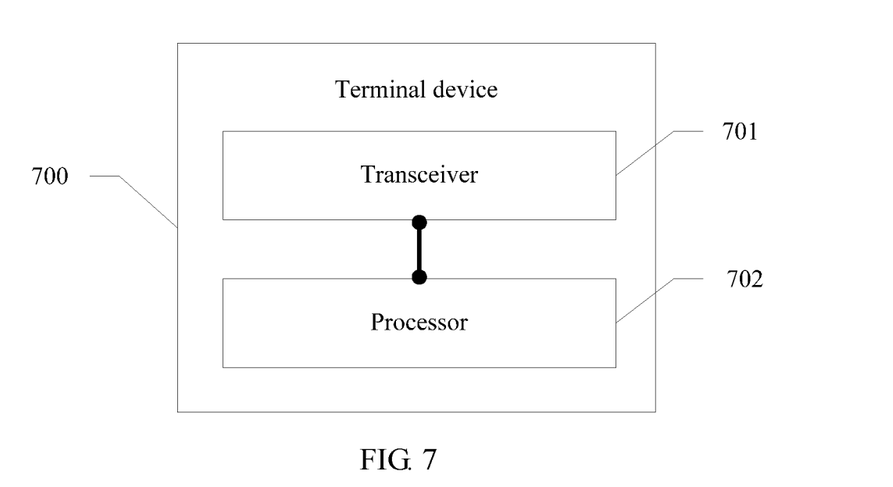
FIG. 7 is a schematic diagram of an embodiment of a terminal device according to an embodiment of the present invention.

Referring to FIG. 7, an embodiment of the present invention further provides a terminal device 700, where the terminal device 700 includes:

a transceiver 701 and a processor 702.

The transceiver 701 is configured to receive a plurality of virtual channel indexes from a base station.

The processor 702 is configured to: select a virtual channel index from the plurality of virtual channel indexes, and determine, based on the virtual channel index, physical channels corresponding to the virtual channel index on a plurality of subframes, where at least two of the physical channels corresponding to the virtual channel index on the plurality of subframes are different.

The transceiver 701 is further configured to communicate, on at least one of the plurality of subframes, with the base station using the physical channel corresponding to the virtual channel index.

Figure 8:
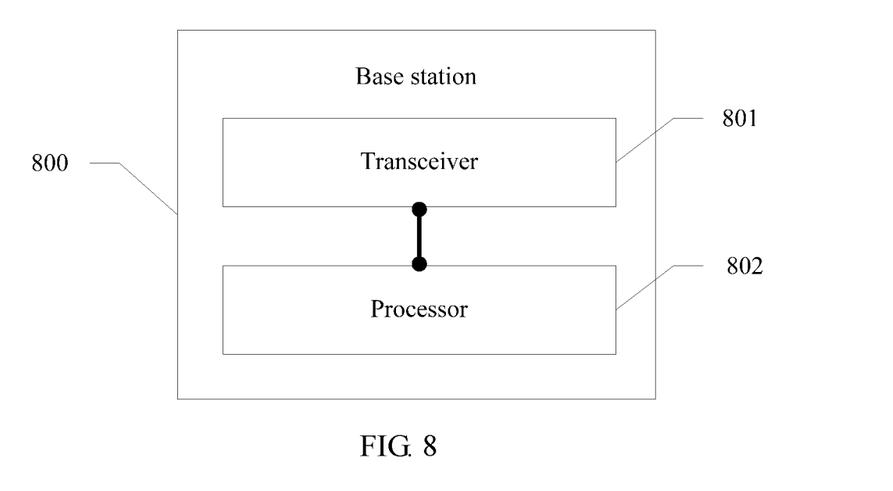
FIG. 8 is a schematic diagram of an embodiment of a base station according to an embodiment of the present invention.

Referring to FIG. 8, an embodiment of the present invention further provides a base station 800, where the base station 800 includes:

a transceiver 801 and a processor 802.

The transceiver 801 is configured to send a plurality of generated virtual channel indexes.

The processor 802 is configured to: for any virtual channel index D in the plurality of virtual channel indexes, determine, based on the D, a physical channel corresponding to the D on each of the plurality of subframes, where at least two of the physical channels corresponding to the D on different subframes are different, and determine a virtual channel index selected by a terminal device, where the virtual channel index is one of the plurality of virtual channel indexes.

The transceiver 801 is further configured to communicate, on at least one of the plurality of subframes, with the terminal device using the physical channel corresponding to the virtual channel index.

Figure 9:
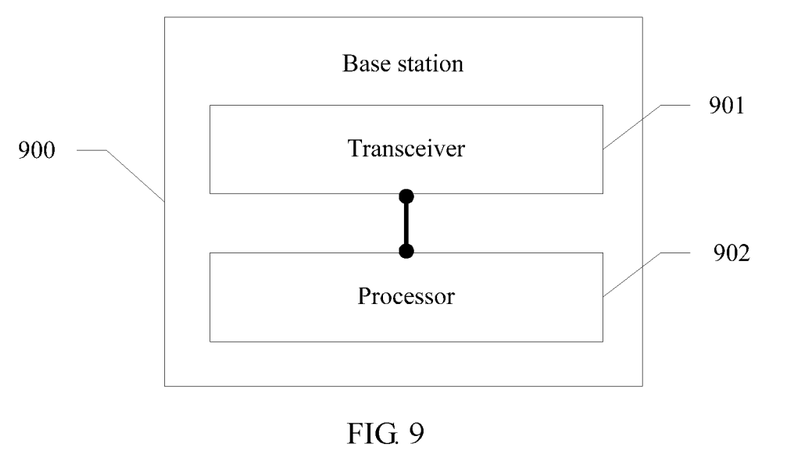
FIG. 9 is a schematic diagram of an embodiment of a base station according to an embodiment of the present invention.

Referring to FIG. 9, an embodiment of the present invention further provides a base station 900, where the base station 900 includes:

a transceiver 901 and a processor 902.

The transceiver 901 is configured to send a plurality of generated virtual channel indexes.

The processor 902 is configured to: determine, based on each of the plurality of virtual channel indexes, a physical channel corresponding to each virtual channel index on a subframe, where the physical channels corresponding to any two of the plurality of virtual channel indexes on the subframe are different, and determine a virtual channel index selected by the terminal device, where the virtual channel index is one of the plurality of virtual channel indexes.

The transceiver 901 is further configured to communicate, on the subframe, with the terminal device using the physical channel corresponding to the virtual channel index.

It may be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the current system, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method of frequency hopping communication, comprising:
   receiving, by a terminal device from a base station, a plurality of virtual channel indexes;
   selecting, by the terminal device, a virtual channel index from the plurality of virtual channel indexes;
   determining, by the terminal device based on the virtual channel index, physical channels corresponding to the virtual channel index on a plurality of subframes, wherein at least two of the physical channels corresponding to the virtual channel index on the plurality of subframes are different; and
   communicating, by the terminal device, with the base station using a physical channel corresponding to the virtual channel index on at least one of the plurality of subframes.

2. The method according to claim 1, comprising: further determining, by the terminal device based on the virtual channel index and one or any combination of the following: a physical cell identifier, a configuration parameter of a quantity of system channels, a frame number, a subframe number, or a super frame number, the physical channels corresponding to the virtual channel index on the plurality of subframes.

3. The method according to claim 1, wherein in the physical channels corresponding to the plurality of virtual channel indexes on the plurality of subframes, physical channels corresponding to a same virtual channel index on two adjacent subframes are different.

4. The method according to claim 1, wherein the receiving, by a terminal device, a plurality of virtual channel indexes from a base station comprises:
   receiving, by the terminal device, the plurality of virtual channel indexes from the base station using a broadcast message or a dedicated message.

5. A method of frequency hopping communication, comprising:
   sending, by a base station, a plurality of generated virtual channel indexes;
   determining, by the base station based on each of the plurality of virtual channel indexes, a physical channel corresponding to each virtual channel index on a subframe, wherein the physical channels corresponding to any two of the plurality of virtual channel indexes on the subframe are different;
   determining, by the base station, a virtual channel index selected by a terminal device, wherein the virtual channel index is one of the plurality of virtual channel indexes; and
   communicating, by the base station on the subframes, with the terminal device using the physical channel corresponding to the virtual channel index.

6. The method according to claim 5, further comprising:
   determining, by the base station, based on each of the plurality of virtual channel indexes, a subframe group corresponding to the each of the plurality of virtual channel indexes; and
   for any virtual channel index D in the plurality of virtual channel indexes, determining, by the base station based on the D, a physical channel corresponding to the D on each subframe in a subframe group Z corresponding to the D, wherein physical channels corresponding to any two of the plurality of virtual channel indexes on a same subframe are different.

7. The method according to claim 5, wherein for any virtual channel index D in the plurality of virtual channel indexes, at least two of the physical channels corresponding to the D on different subframes are different.

8. The method according to claim 5, wherein in the physical channels corresponding to the plurality of virtual channel indexes on the plurality of subframes, physical channels corresponding to a same virtual channel index on two adjacent subframes are different.

9. The method according to claim 5, further comprising: further determining, by the base station based on the D and one or any combination of the following: a physical cell identifier, a configuration parameter of a quantity of system channels, a subframe number, or a super frame number, a physical channel corresponding to the D on any subframe in the Z.

10. The method according to claim 5, wherein the sending, by a base station, a plurality of generated virtual channel indexes comprises: sending, by the base station, the plurality of generated virtual channel indexes using a broadcast message or a dedicated message.

11. A terminal device, comprising:
a transceiver, configured to receive from a base station a plurality of virtual channel indexes; and
at least one processer, configured to: select a virtual channel index from the plurality of virtual channel indexes, and determine, based on the virtual channel index, physical channels corresponding to the virtual channel index on a plurality of subframes, wherein at least two of the physical channels corresponding to the virtual channel index on the plurality of subframes are different; wherein
the transceiver is further configured to communicate, on at least one of the plurality of subframes, with the base station using the physical channel corresponding to the virtual channel index.

12. The terminal device according to claim 11, wherein the transceiver is configured to:
receive from the base station the plurality of virtual channel indexes using a broadcast message or a dedicated message.

13. The terminal device according to claim 11, wherein the at least one processor is further configured to determine, based on the virtual channel index and one or any combination of the following: a physical cell identifier, a configuration parameter of a quantity of system channels, a frame number, a subframe number, or a super frame number, the physical channels corresponding to the virtual channel index on the plurality of subframes.

14. The terminal device according to claim 11, wherein in the physical channels corresponding to the plurality of virtual channel indexes on the plurality of subframes, physical channels corresponding to a same virtual channel index on two adjacent subframes are different.

* * * * *